May 1, 1923.
M. SCHUETZ
ANIMAL TRAP
Filed June 9, 1922    2 Sheets-Sheet 1
1,454,015
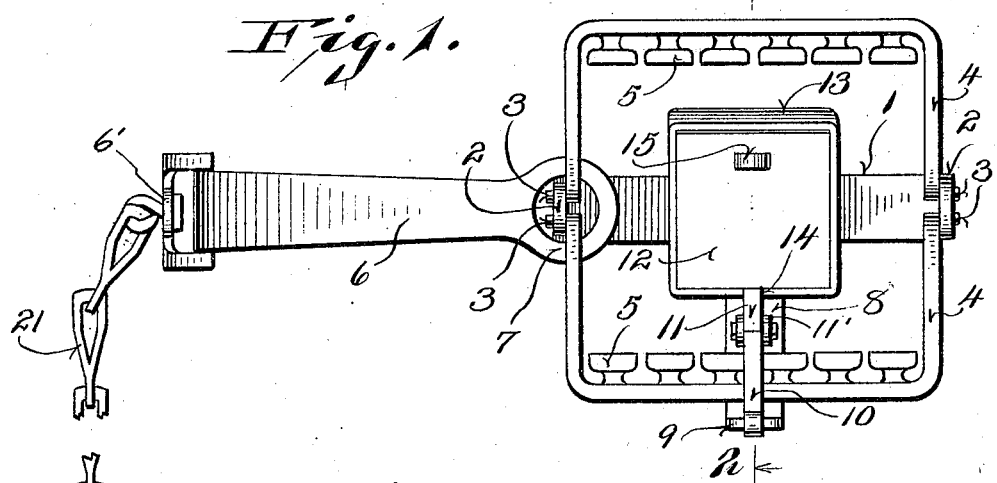
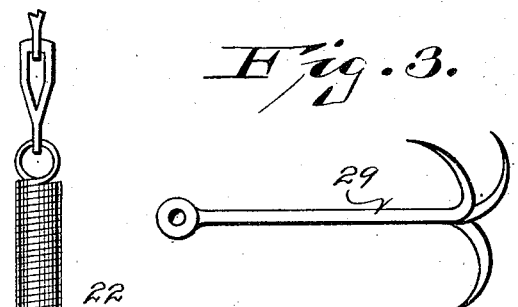
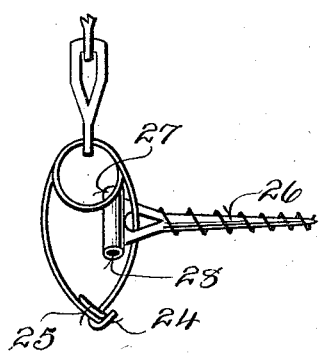
Inventor
Michael Schuetz
Attorneys May 1, 1923. 1,454,015
M. SCHUETZ
ANIMAL TRAP
Filed June 9, 1922 2 Sheets-Sheet 2
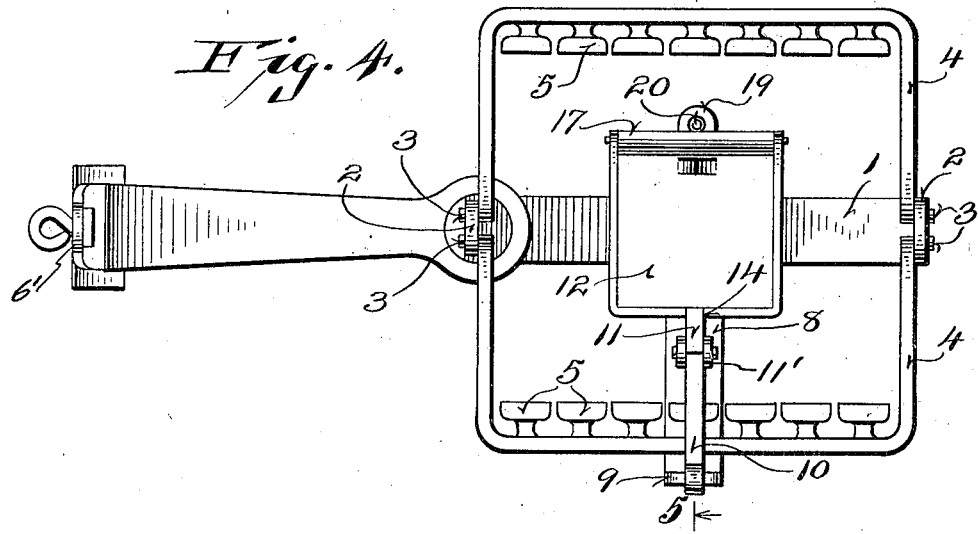
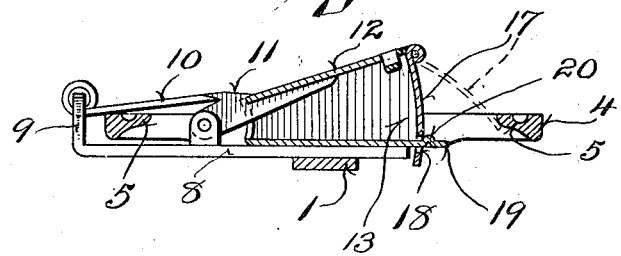
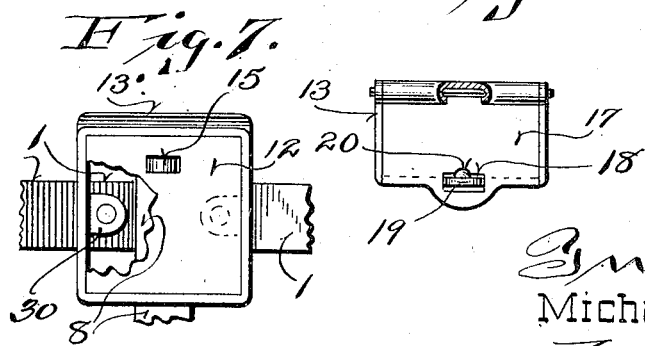
Inventor
Michael Schuetz
By
Attorneys Patented May 1, 1923.

1,454,015

UNITED STATES PATENT OFFICE.

MICHAEL SCHUETZ, OF SHEBOYGAN, WISCONSIN, ASSIGNOR OF ONE-FOURTH TO FRANK SCHOMMER, OF SHEBOYGAN, WISCONSIN.

ANIMAL TRAP.

Application filed June 9, 1922. Serial No. 567,081.

*To all whom it may concern:*

Be it known that I, MICHAEL SCHUETZ, a citizen of the United States, and resident of Sheboygan, in the county of Sheboygan and State of Wisconsin, have invented certain new and useful Improvements in Animal Traps; and I do hereby declare that the following is a full, clear, and exact description thereof.

This invention relates to animal traps and has primarily for its object to provide means for preventing snow, dirt, and other obstructions from getting under the trigger plate and preventing the release of the spring jaws.

In connection with a trap embodying the foregoing characteristics, an additional object resides in the provision of means for facilitating the setting of the trap, with a maximum margin of safety to the person manipulating the same.

A further object is to provide improved means for anchoring the trap, including detachable clips for connecting the anchor chain and yieldable means disposed between the trap and anchor to relieve strain on the anchor and also prevent the animal from breaking or withdrawing its leg from the trap.

With the above and other objects in view, which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principes thereof, and in which:

Figure 1 is an elevational plan view of one form of the invention, illustrating improved means for anchoring the trap.

Figure 2 is a transverse, sectional view taken on the line 2—2 of Figure 1,

Figure 3 is an elevational view of a modified form of anchor.

Figure 4 is a plan view of a modified form of the invention.

Figure 5 is a transverse, sectional view taken on the line 5—5 of the Figure 4.

Figure 6 is a detail view of the pivoted closure for the receptacle, as employed in that form of the invention illustrated in Figures 4 and 5, and Figure 7 is a fragmentary plan view of a third modification of the invention, with parts broken away and in section to more clearly illustrate the structural details.

Referring now more particularly to the accompanying drawings, a conventional type of spring trap is illustrated in which the numeral 1 designates a base plate provided with upturned ears 2 at its ends adapted to receive the pintles 3 projecting from the side arms of the jaws 4.

In connection with the present invention, I prefer to use a type of jaw provided with inwardly projecting teeth 5 which are adapted to more securely engage the limb of an animal and thereby prevent possibility of withdrawal of the same. A conventional type of spring loop 6 is employed for actuating the jaws 4, the ends of the loop being provided with eyes 7 adapted to engage the arms of the jaws 4 and actuate the same in the conventional manner. I, also, prefer to use that type of spring loop wherein the eye is slightly inclined to permit setting of the trap at right angles to the loop, either to the left or right side of the loop.

The base 1 is provided with a lateral extension 8 having an upturned ear 9 at its extreme end, in which is pivoted a latch 10, the same being adapted to engage one of the jaws 4, thereby locking the trap in its set or open position. For the purpose of retaining the latch 10, a notched trigger 11 is vertically pivoted on supports 11' on the lateral extension 8, the notch engaging and releasibly holding the latch 10 against movement. The trigger 11 has secured thereto a trigger plate 12, which, for the purpose of the present invention, I prefer to construct in rectangular shape instead of the usual round plate.

The foregoing description is confined to a conventional or standard type of animal trap, and therefore forms no part of the present invention other than in the combination which will be hereinafter claimed.

In order to prevent the accumulation of snow, dirt, or other obstacles from accumulating under the trigger plate 12, thereby preventing its depression and release of the spring jaws, I propose to employ a guard in the form of a receptacle 13, which is secured to the base 1 directly below the trigger plate and whose side walls surround the edge of the trigger plate in such manner that the trigger plate forms a complete closure for the receptacle, one of the side walls being slotted out at 14 to permit movement of the trigger within the receptacle.

In order to facilitate setting of this particular form of the invention, as disclosed in Figures 1 and 2, the trigger plate 12 is provided with a punched out loop 15 which is adapted to receive the end of a hook 16, thereby enabling the trigger plate to be raised for the purpose of engaging and securing the latch 10 in the setting operation.

In that form of the invention, as disclosed in Figures 4, 5, and 6 of the drawings, the necessity of the foregoing arrangement is eliminated, in that one end of the receptacle 13 is provided with a pivoted closure or door 17 having a slot 18 adjacent its lower edge adapted to receive the tongue 19 projecting from the bottom of the receptacle. In order to prevent accidental opening of the door 17, the tongue 19 is provided with a nib 20, a slight spring in the door permitting it to be snapped over the nib.

A further advantage of this structure resides in the fact that the trigger can be manipulated from the under side of the trap by swinging the door 17 open and inserting the fingers into the receptacle, thereby eliminating any necessity for placing the hand above the trap, in which position it is subjected to the danger of being pinched by the jaws should the trap become accidentally released.

For the purpose of anchoring the trap, the usual type of swivel 6' is carried on the spring loop 6, which swivel is connected to the anchor means by a chain 21, in which is disposed a spring 22. To facilitate attachment of the chain to the anchor, I provide a spring clip 23, one end of which is formed into a hook 24, while the opposite end forms an eyelet 25 adapted to receive said hook and secure the clip in its closed position. This form of clip eliminates the tedious operation of wiring the chain to the anchor, which is employed at the present time. Instead of using the usual spike or peg for securing the free end of the chain to a tree or post, I propose to use a lag screw 26 having a transverse head 27 provided with a longitudinal opening 28 into which may be inserted a nail or spike for the purpose of securing the lag into the tree. In the event that it is not desired to use a stationary anchor, I illustrate in Figure 3 of the drawings, one form of drag hook 29 to which the chain may be attached.

Attention is directed to the fact that the provision of the spring 22 in the anchor chain provides a yieldable connection between the anchor and trap, thus eliminating strain on the chain, which results from an animal tugging at the trap in an endeavor to free itself. Also, in many cases where the trap is rigidly secured to the anchor, the animal has been known to break its leg and thus free itself from the trap. The yieldable connection eliminates this possibility.

In the modified form of the invention illustrated in Figure 7 of the drawing, I propose to construct the guard or receptacle 13' without a bottom, the receptacle being attached to the base 1 by means of ears 30 carried by the side walls and riveted to the base. This construction permits setting of the trigger by inserting the fingers into the receptacle from the bottom and raising the trigger plate to its latching position.

I claim:—

A spring trap, a vertically pivoted trigger plate actuable to release the jaws of the trap upon depression, a receptacle, the side walls of which surround the trigger plate, said plate serving as a closure for said receptacle, and one of the side walls being pivoted to permit access to the receptacle for the purpose of setting the trigger.

In testimony that I claim the foregoing I have hereunto set my hand at Sheboygan, in the county of Sheboygan, and State of Wisconsin.

MICHAEL SCHUETZ.